Figure 1:
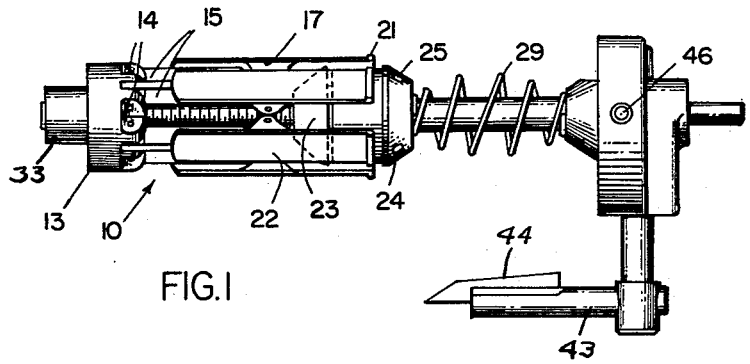

March 2, 1965 A. J. CLOUTIER 3,171,309

DEVICE FOR TURNING MALE ENDS ON PIPE

Filed Nov. 19, 1962 2 Sheets-Sheet 1

INVENTOR.
ALFRED J. CLOUTIER
BY
ATTORNEY

March 2, 1965  A. J. CLOUTIER  3,171,309
DEVICE FOR TURNING MALE ENDS ON PIPE
Filed Nov. 19, 1962  2 Sheets-Sheet 2

INVENTOR.
ALFRED J. CLOUTIER
BY
ATTORNEY

United States Patent Office 3,171,309
Patented Mar. 2, 1965

3,171,309
DEVICE FOR TURNING MALE ENDS ON PIPE
Alfred Joseph Cloutier, Ocean Park Road, Saco, Maine
Filed Nov. 19, 1962, Ser. No. 238,582
8 Claims. (Cl. 82—4)

The present invention relates to a device for use in forming male ends on tubular members.

While the invention is adapted to a wide range of uses, it is discussed herein with particular reference to the turning of male ends on soil pipe, particularly that type that is molded into light weight lengths provided with male and female ends. Among the advantages of this type of pipe is that it may be cut as readily as wood when a shorter length is needed. In practice, however, this advantage cannot be fully realized without some means of quickly and accurately turning the sawed lengths to provide them with male ends and the objective of this invention is to provide means for so doing.

In accordance with the invention, a device for turning such male ends has a base including a threaded sleeve provided at its outer end with a head, a member threaded on the sleeve, a plurality of shoes for engagement with the interior surface of the tubular member, and a plurality of links, each pivoted to the threaded member and an appropriate one of the shoes. An annular wedge is slidable on the sleeve into engagement with the links and is operable to wedge the links outwardly on rotation of the sleeve relative to the threaded member thereby to bring the shoes into clamping engagement with the interior surface of the tubular member. A shaft is slidable in the sleeve with its inner end threaded, the shaft including a head, a compression spring located between and seated against the shaft and sleeve heads. A cutter is carried by said head for operative engagement with the outer surface of the tubular member, and a nut threaded on the shaft has a counter bore threaded on the sleeve whereby turning of the shaft provides a feed for the cutting tool at the rate determined by the threaded engagement of the shaft and the nut.

In the accompanying drawings, there are shown illustrative embodiments of the invention from which these and other of its objectives, novel features, and advantages will be readily apparent.

Figure 2:
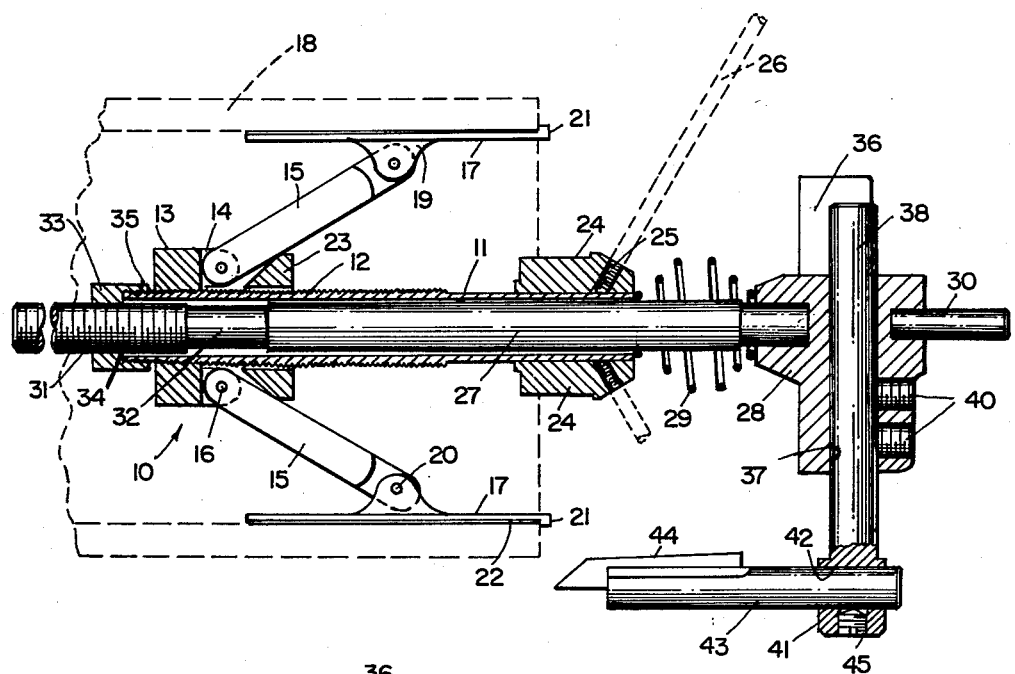
Figure 3:
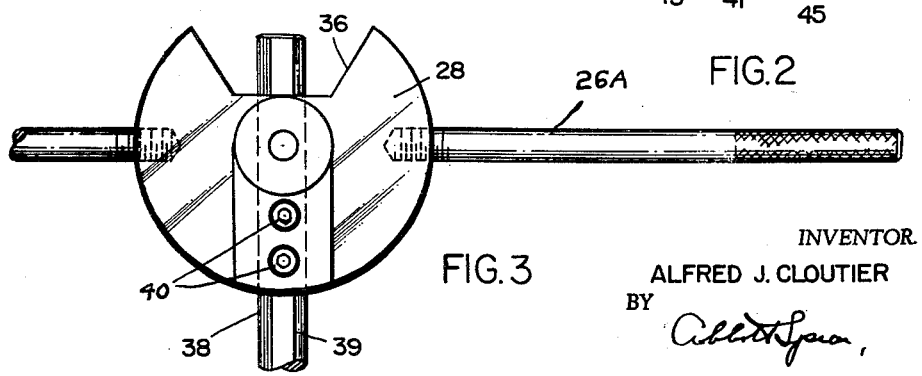
Figure 4:
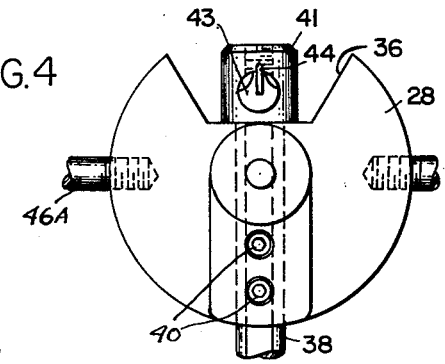
Figure 5:
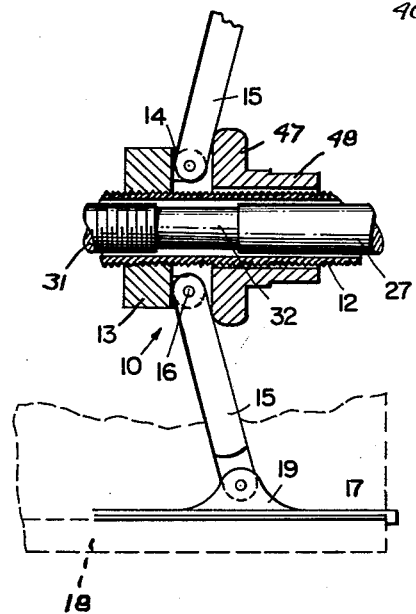
Figure 6:
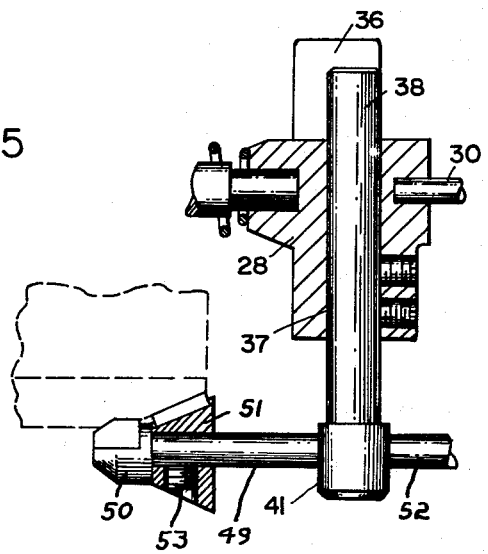
Figure 7:
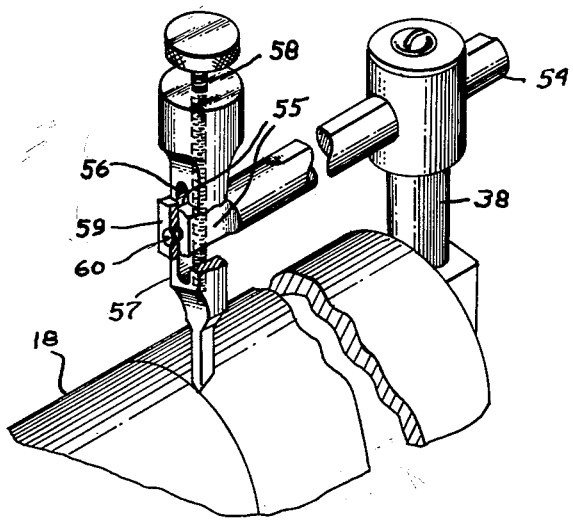

In the drawings:

FIGURE 1 is a side elevation of a device for turning male ends on pipe sections, FIGURE 2 is a longitudinal section, on an increased scale, illustrating the device clamped in one end of a length of pipe, FIGURE 3 is a view of the device as seen from its outer end, FIGURE 4 is a view similar to FIGURE 3 but with the cutting means adjusted for a pipe of a smaller diameter, FIGURE 5 is a fragmentary section illustrating certain of the parts shown in FIGURE 2 with a wedge designed for lengths of pipe of larger diameter, FIGURE 6 is a side elevation of a cutter for forming a differently shaped male end on a length of a pipe, FIGURE 7 is a side elevation of a cut-off cutter for use when the end of a length of pipe is to be severed.

In the drawings, a base is generally indicated at 10 and is shown as comprising a sleeve 11 threaded as at 12 to receive a threaded ring 13 which is provided with a series of pairs of spaced ears 14. A series of links 15 are provided, one for each pair of ears 14 and secured therebetween by a pivot pin 16. The base 10 also includes a series of shoes 17, for engagement with the interior of a length of pipe 18. There is one shoe for each link 15 and each shoe has a pair of ears 19 enabling the outer end of a link 15 to be attached thereto by a pivot pin 20. Each shoe 17 has an outwardly disposed end flange 21 which is engageable with the end of the pipe 18 and it is preferred that each shoe have a suitable gripping surface such as a rubber coat 22.

Slidable on the sleeve 11 is an annular wedge 23 adapted to be slid along the sleeve 11 to engage the links 15 and to hold them outwardly in a position in which the base 10 is so adjusted that the shoes 17 are a loose fit in the end of the pipe 18. The sleeve 11 has a head 24 fast on its outer end and the outer end of the head 24 is tapered and has rearwardly and outwardly inclined threaded bores 25 for a detachable handle indicated at 26 in FIGURE 2 to facilitate turning the head 24, and, accordingly, the sleeve 11 thus to draw the ring 13 axially outwardly with respect to the pipe 18 thus to force the links 15 into wedging contact with the wedge 23 thus forcing the shoes into tight holding engagement with the interior surfaces of the pipe 18.

A shaft 27 extends slidably and rotatably through the sleeve 11 and has a head 28 fast on its outer end. A spring 29 is disposed between the heads 24 and 28 and the head 28 has a stub shaft 30 extending outwardly from its outer face in axial alinement with the shaft 27 to receive the chuck of a tool, not shown, which may be either manually operated or power driven.

The other or inner end of the shaft 27 is threaded as at 32 beyond a section 32 of reduced diameter. A nut 33 has a bore 34 which is threaded to receive the threaded section 32 and the threaded counterbore 35 for attachment to the inner extremity of the sleeve 11.

The head 28 has a cut-out area 36 of substantial radial extent and a bore 37 extends diametrically through the head 28, opening into the cut-out area 36. A tool supporting shank 38, preferably having a flat 39, extends through the bore 37 and is locked therein by set screws 40. At one end of the shank 38, there is a head 41 having a bore 42 slidably receiving the tool shank 43 carrying a cutter 44 and a set screw 45 to lock the tool shank with its cutter in position to turn down the outer surface of the pipe to establish a desired male end thereon, the cutter 44 being shown as one that forms a taper.

With the base 10 secured in the end of the pipe, and with the cutter 44 positioned to engage and turn down the outer surface thereof, the device is ready for use. With the device as shown in FIGURE 2, the shaft 27 is to be turned by a driving tool or by means of handles 26A threaded in bores 46 in the head 28 and as the shaft 27 turns, the cutter is swung about the pipe 18 and advances as determined by the feed established by the threaded connection between the shaft section 31 and the nut 33. If the shaft is to be turned with a power driven tool, the nut may be removed and the shaft moved axially by manually applied end pressure as required, since adequate power is then available for a smooth turning operation.

As shown in FIGURE 4, if the end of a pipe of small diameter is being turned, the shank 38 may be inserted into the bore 37 from the end thereof that opens into the cut-out 36 with the shank head 41 entrant of that zone.

With large sized pipes, the wedge 47, see FIGURES 5, may be used and this is of greater diameter than the wedge 23 and has a forwardly extending shank 48, spacing the wedge 47 away from the head 24. In practice the wedge 47 is used with pipe from 5" to 8" in diameter and the wedge 23 is used for pipe, the inside diameter of which is in the approximate range of from 3" to 5", for example.

In FIGURE 6, there is shown a different tool having a shank 49 provided with a cutter 50 for turning, for example, a cylindrical area and a removable cutter 51 for turning a taper. In this case, the shank 49 has a flat 52 facilitating the locking of the cutter 51 thereto by means of the set screw 53.

In FIGURE 7 there is shown a cut-off tool having a shank 54 attachable to the supporting shank 38 with its free end formed with parallel flat faces 55 dimensioned to slidably fit a slot 56 in the cutter 57. An adjusting screw 58 is threaded through the outer end of the cutter 57 and through that part of the shank 38 that is within the slot 56 thus to provide means for feeding the cutter radially inwardly and outwardly. A keeper 59 is shown as secured to the free end of the shank 54 by a screw 60.

From the foregoing, it will be appreciated that devices in accordance with the invention are simple in construction, easy to operate, and are well adapted to meet the requirements encountered in forming male ends on lengths of pipe.

I claim:

1. In a device for use in turning a male end on a tubular member, a base including a threaded sleeve provided at its outer end with a head, a member threaded on the inner end of said sleeve, a plurality of shoes for engagement with the interior surface of the tubular member, and a plurality of links, each pivoted to said threaded member and an appropriate one of said shoes, and an annular wedge slidable on said sleeve into engagement with said links and operable to wedge said links outwardly on rotation of said sleeve relative to said threaded member thereby to bring said shoes into clamping engagement with said interior surface, a shaft slidable in said sleeve with its inner end threaded, said shaft including a head outwardly of said sleeve head, a cutter carried by said shaft head for operative engagement with the outer surface of said tubular member, and a nut threaded on said shaft and including a counterbore receiving said sleeve whereby turning of said shaft in a predetermined direction advances said cutting means at a rate determined by the threaded engagement of said shaft and nut.

2. In a device for use in turning a male end on a tubular member, a base including a threaded sleeve provided at its outer end with a head, a member threaded on the inner end of said sleeve, a plurality of shoes for engagement with the interior surface of the tubular member, and a plurality of links, each pivoted to said threaded member and an appropriate one of said shoes, and an annular wedge slidable on said sleeve into engagement with said links and operable to wedge said links outwardly on rotation of said sleeve relative to said threaded member thereby to bring said shoes into clamping engagement with said interior surface, a shaft slidable in said sleeve with its inner end threaded, said shaft including a head outwardly of said sleeve head, a cutter carried by said shaft head for operative engagement with the outer surface of said tubular member, and a nut threaded on said shaft and including a counterbore threaded on said sleeve whereby turning of said shaft in a predetermined direction advances said cutting means, at the rate determined by the threaded engagement of the shaft and nut, said shaft having a portion adjacent its threaded end and of reduced diameter, said portion being of greater length than the axial extent of said nut thereby enabling said shaft to turn freely with the nut and threaded shaft portion disengaged.

3. In a device for use in turning a male end on a tubular member, a base including a threaded sleeve provided at its outer end with a head, and including adjustable means engageable with the interior surface of the tubular member on rotation of said sleeve, a shaft slidable in said sleeve with its inner end threaded, said shaft including a head outwardly of said sleeve head, a compression spring located between and seated against said heads, and a cutter carried by said shaft head for operative engagement with the outer surface of said tubular member.

4. In a device for use in turning a male end on a tubular member, a base including a threaded sleeve provided at its outer end with a head, and including adjustable means engageable with the interior surface of the tubular member on rotation of said sleeve, a shaft slidable in said sleeve with its inner end threaded, said shaft including a head outwardly of said sleeve head, said shaft head including a cut-out and having a diametrically disposed bore opening into said cutout, a shank extending through said head bore, and a tool secured to the outer end of said shank, said shank being disposable in said head bore with said outer end in said cut-out.

5. In a device for use in turning a male end on a tubular member, a base including a threaded sleeve provided at its outer end with a head, and including adjustable means engageable with the interior surface of the tubular member on rotation of said sleeve, a shaft slidable in said sleeve with its inner end threaded, said shaft including a head outwardly of said sleeve head, a shank adjustably carried by said shaft head, and a tool including a shank attached to the end of said head shank and provided with a cutter for operative engagement with the outer surface of said tubular member.

6. The device of claim 5 in which the cutter includes a section fast on said tool shank and a section detachably locked thereto.

7. In a device for use in turning a male end on a tubular member, a base including a threaded sleeve provided at its outer end with a head, and including adjustable means engageable with the interior surface of the tubular member on rotation of said sleeve, a shaft slidable in said sleeve with its inner end threaded, said shaft including a head outwardly of said sleeve head, a compression spring located between and seated against said heads, a shank adjustably carried by said shaft head, and a tool including a shank attached to the end of said head shank, a cut-off cutter, and means attaching said cut-off cutter at right angles to said tool shank and operable to adjust its position radially relative thereto.

8. The device of claim 7 in which the cut-off cutter has a lengthwise slot, the tool shank has its end entrant of the slot and slidably held thereby against rotation, and a screw threaded through the outer end of the cut-off cutter and through the tool shank end thereof to provide a cutter feed.

References Cited in the file of this patent

UNITED STATES PATENTS

| | | |
|---|---|---|
| 938,058 | Johnston | Oct. 26, 1909 |
| 1,231,743 | Johnston | July 3, 1917 |
| 1,674,372 | Noonneman | June 19, 1928 |
| 1,823,959 | Steinmayer | Sept. 22, 1931 |
| 1,993,561 | Meghtz | Mar. 5, 1935 |
| 2,348,186 | Bashore | May 9, 1944 |
| 2,451,729 | Gardner | Oct. 19, 1948 |
| 2,537,916 | Rosenboom | Jan. 9, 1951 |
| 2,793,553 | Mathews | May 28, 1957 |
| 2,861,608 | Brown | Nov. 25, 1958 |